United States Patent [19]
Weik et al.

[11] Patent Number: 6,160,882
[45] Date of Patent: Dec. 12, 2000

[54] SUBSCRIBER ACCESS NETWORK, EXCHANGE, SERVICE CONTROL POINT, AND METHOD OF ESTABLISHING A CONNECTION

[75] Inventors: Hartmut Weik, Stuttgart; Wolfgang Lautenschlager, Weissach-Flacht, both of Germany

[73] Assignee: Alcatel, Paris, France

[21] Appl. No.: 09/076,511

[22] Filed: May 12, 1998

[30] Foreign Application Priority Data

May 14, 1997 [DE] Germany ............................ 197 20 086

[51] Int. Cl.$^7$ ...................................................... H04M 7/00
[52] U.S. Cl. ............................ 379/220; 379/207; 379/230
[58] Field of Search ....................................... 379/221, 225, 379/230, 211, 212, 220, 207, 201, 219, 229, 234

[56] References Cited

U.S. PATENT DOCUMENTS

| | | |
|---|---|---|
| 5,375,167 | 12/1994 | Bales et al. . |
| 5,553,130 | 9/1996 | Turner . |
| 5,892,821 | 4/1999 | Turner ................................. 379/207 X |
| 5,940,496 | 8/1999 | Gisby et al. .......................... 579/212 X |
| 5,982,870 | 11/1999 | Pershan et al. ...................... 379/127 X |
| 6,097,802 | 8/2000 | Fleischen et al. ....................... 379/211 |

FOREIGN PATENT DOCUMENTS

| | | |
|---|---|---|
| 0641134 | 3/1995 | European Pat. Off. . |
| 4230561 | 5/1993 | Germany . |
| 4329172 | 3/1995 | Germany . |
| 19515856 | 10/1996 | Germany . |
| 2297882 | 8/1996 | United Kingdom . |
| 9306674 | 9/1992 | WIPO . |
| 9621323 | 7/1996 | WIPO . |

OTHER PUBLICATIONS

"Mobilitat in privaten Telekommunikationsnetzwerken (PTN)" by Cabestre et al, pp. 14–20 Das technische Magazin von Ascom. In: tec Mar. 1995. No Translation.
Implementation of UPT—Universal Personal Telecommunication by Wallinder. In: Ericsson Review, No. 1, 1994— pp. 40–48.
"Mobile Information Infrastructure" by Ayanoglu, et al In: BEll Labs Technical Journal, Autumn, 1996, pp. 143–164.
"Virtual Private Network Call Processing in the Intelligent Network" by Atoui, Discovering a New World of Communications, Jun. 14–18, 1992 Chicago, pp. 561–565.

*Primary Examiner*—Creighton Smith
*Attorney, Agent, or Firm*—Ware, Fressola, Van Der Sluys & Adolpshon LLP

[57] ABSTRACT

To establish a connection to a terminal (TE5) of a subscriber access network (AN), a connection request directed to the terminal and containing a public number (CN) corresponding to the number of the terminal in a first public numbering range is routed to a switching unit (SSP, SCP) of the subscriber access network. From the public number (CN), the switching unit (SSP, SCP) determines that of two or more private branch exchanges (PABX1 to PABX3) of the subscriber access network in whose private numbering range the public number (CN) is assigned to the terminal (TE5) as an extension number. The switching unit (SSP, SCP) forms a virtual number (CVN) from the public number (CN) and an identification assigned to the determined private branch exchange (PABX2), and enters this virtual number (CVN) in the connection request. The connection request with this virtual number is then routed to the determined private branch exchange (PABX2) to initiate the establishment of the connection to the terminal.

17 Claims, 2 Drawing Sheets

SUBSCRIBER ACCESS NETWORK, EXCHANGE, SERVICE CONTROL POINT, AND METHOD OF ESTABLISHING A CONNECTION

TECHNICAL FIELD

This invention relates to a subscriber access network for the connection of terminals which can be reached through the subscriber access network by means of respective public numbers assigned to them in a public numbering range, the subscriber access network comprising a plurality of exchanges for connecting the terminals to the subscriber access network to an exchange for a subscriber access network, to a service control point for a subscriber access network, and to a method of establishing a connection to a terminal of a subscriber access network.

BACKGROUND OF THE INVENTION

A subscriber access network comprising a plurality of switching nodes is commonly constructed from a plurality of subscriber terminal exchanges and, if necessary, transit exchanges which are interconnected via a No. 7 signaling system. Each of the terminals connected to the subscriber access network is assigned a public number of the numbering area in which the subscriber access network is located.

The invention is based on a routing scheme for such a subscriber access network as is described in U.S. Pat. No. 5,375,167. The subscriber access network is constructed from a plurality of subscriber terminal exchanges and one or more higher-ranking transit exchanges. Each terminal exchange is assigned at least one block of numbers within the numbering range of the subscriber access network. The assignment of the blocks of numbers is managed by the higher-ranking transit exchange. Blocks of numbers are requested by one of the subordinate exchanges and assigned by the higher-ranking exchange. By adapting the routing tables of the terminal exchanges, it is possible to assign the public numbers to subscriber lines within the blocks of numbers assigned to a terminal exchange in an arbitrary manner.

For the establishment of a connection, the called public number entered in a connection request is analyzed successively as usual: The front part of the number addresses a block of numbers, and thus one of the subordinate exchanges. This part is analyzed by the higher-ranking exchange. The rear part of the number addresses a subscriber within the internal numbering range of a terminal exchange and is analyzed by the latter.

One disadvantage of such a subscriber access network is that it involves a considerable amount of technical complexity: Several terminal exchanges and at least one transit exchange are needed.

Particularly for an operator of a small subscriber access network who shares a numbering range with other operators and their subscriber access networks, this complexity is disproportionately high.

Another disadvantage for such an operator is that with this architecture, number portability between subscriber access networks sharing the same numbering range is difficult to implement.

SUMMARY OF THE INVENTION

The object of the invention is to provide a less expensive concept for the establishment of connections to subscribers of a subscriber access network.

This object is attained by a subscriber access network for the connection of terminals which can be reached through the subscriber access network by means of respective public numbers assigned to them in a public numbering range, the subscriber access network comprising a plurality of exchanges for connecting the terminals to the subscriber access network, wherein two or more of the exchanges are private branch exchanges with respective private numbering ranges and each comprise first means adapted to assign to the terminals connected to the respective private branch exchange their respective public numbers as extension numbers in the respective private numbering range, that the subscriber access network comprises second means for determining that of the two or more private branch exchanges from a connection request with a called public number in whose private numbering range the called public number is assigned to a terminal as an extension number, and that the subscriber access network comprises third means for entering a virtual number, consisting of a private branch exchange identification assigned to the private branch exchange determined and the called public number, in the connection request as the called number.

The object is also obtained by an exchange for a subscriber access network for the connection of terminals which can be reached through the subscriber access network by means of respective public numbers assigned to them in a public numbering range, wherein the exchange comprises second means for determining those of two or more private branch exchanges of the subscriber access network from a connection request with a called public number in whose private numbering range the called public number is assigned to a terminal as an extension number, and that the exchange comprises third means for entering a virtual number, consisting of a private branch exchange identification assigned to the private branch exchange determined and the called public number, in the connection request as a called number.

The object is still further attained by a service control point for a subscriber access network for the connection of terminals which can be reached through the subscriber access network by means of respective public numbers assigned to them in a public numbering range, the service control point comprising first means for communicating with a service exchange of the subscriber access network, wherein the service control point comprises second means for determining that of two or more private branch exchanges of the subscriber access network from a connection request with a called public number in whose private numbering range the called public number is assigned to a terminal as an extension number, and that the service control point comprises third means adapted to initiate the entry of a virtual number, consisting of a private branch exchange identification assigned to the private branch exchange determined and the called public number, in the connection request as a called number.

The object is also attained by a method of establishing a connection to a terminal of a subscriber access network, the method comprising the step of routing a connection request directed to the terminal and containing a called public number corresponding to the number of the terminal according to a public numbering range to a switching unit of the subscriber access network, wherein by means of the called public number, the switching unit determines that of two or more private branch exchanges of the subscriber access network in whose private numbering range the called public number is assigned to the terminal as an extension number, that the switching unit forms a called virtual number from the called public number and a private branch exchange identification assigned to the private branch exchange determined, and enters said called virtual number in the connection request, and that the connection request with the called virtual number is routed to the private branch exchange determined, thereby initiating the establishment of the connection.

The idea underlying the invention is to extend the numbering space in a subscriber access network and thus permit the use of private branch exchanges as subscriber terminal exchanges. The called public number in a connection request is mapped onto a virtual number according to this extended internal numbering space. The virtual number additionally contains an identification of the destination private branch exchange and thus has, in addition to the address of the terminal within the numbering range, i.e., the public number, a parallel, independent address of the destination private branch exchange.

The invention makes it possible to construct subscriber access networks mainly from private branch exchanges, which are far lower in cost. Such private branch exchanges also need not support any complex signaling protocols of public network switching, such as the No. 7 signaling system.

Further advantages result if existing private branch exchanges or networks formed from private branch exchanges ("PABX clusters") can be used for the construction of the subscriber access network. This is particularly advantageous for newly appearing subscriber access network operators, such as metropolitan area network operators.

The invention has an added advantage in that the full public numbering range is available in each private branch exchange. Thus, each terminal of a private branch exchange can be assigned any number of the public numbering range. A solution according to the invention is thus especially suited for subscriber access networks in a numbering range which is shared by subscriber access networks of several network operators and in which number portability is required between these subscriber access networks. This requirement exists in a great number of deregulated network environments.

A further advantage for a network operator results from the fact that in most private branch exchanges, a multitude of service features are available. These service features can be made available to the subscribers at no additional cost to the network operator.

According to a particularly advantageous aspect of the invention, the virtual number of the calling subscriber in a connection request is transformed back into a public number. Thus, the extended numbering space also becomes fully transparent for outgoing calls.

BRIEF DESCRIPTION OF THE DRAWINGS

The invention will become more apparent from the following description of two embodiments when taken in conjunction with the accompanying drawings, in which.

BEST MODE FOR CARRYING OUT THE INVENTION

In the first embodiment, the construction of a subscriber access network according to the invention with a service control point according to the invention as well as the connection setup procedure according to the invention will be described with the aid of FIG. 1.

Figure 1:
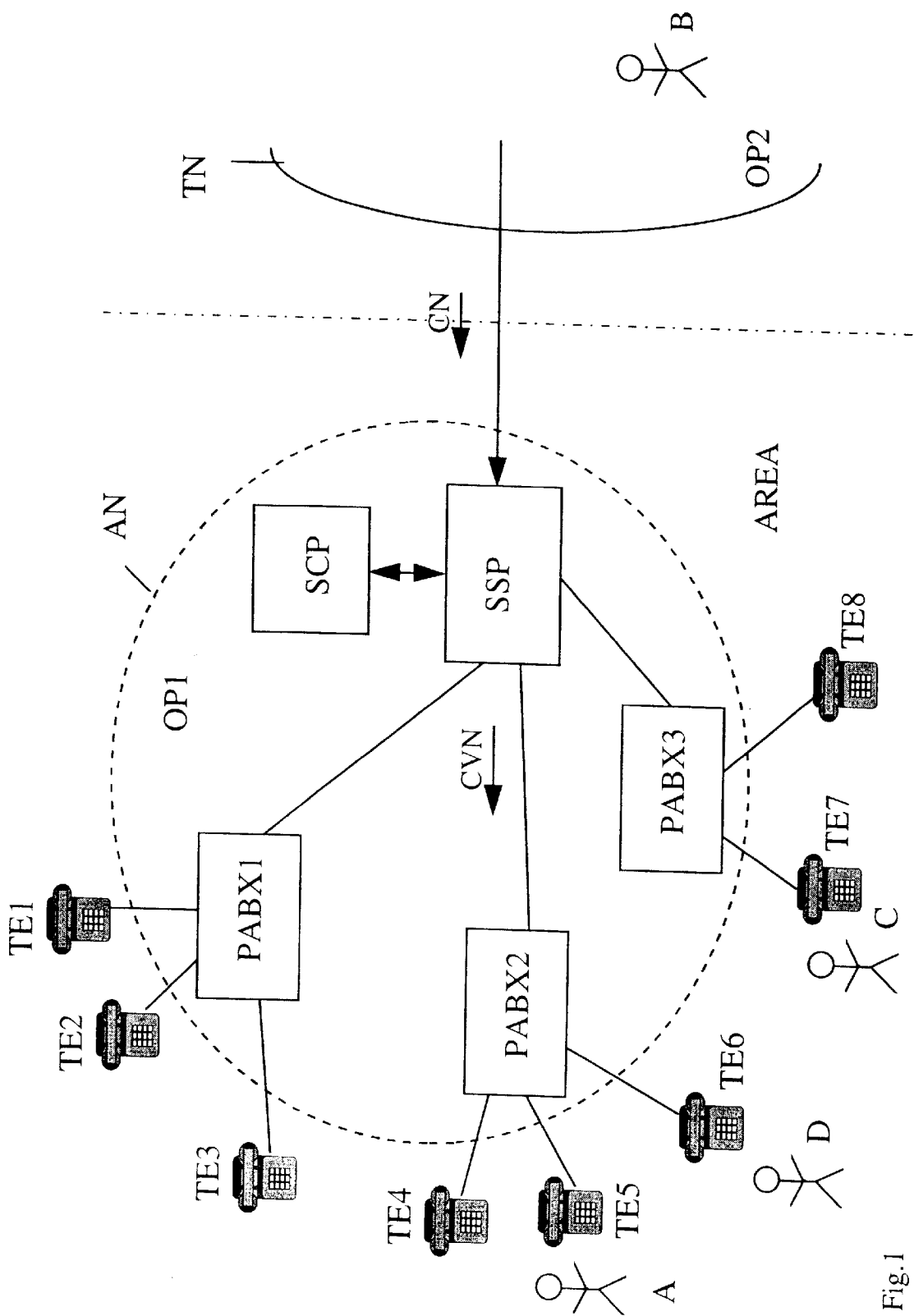
FIG. 1 is a block diagram of a part of a communications system with a subscriber access network according to the invention.

FIG. 1 shows a trunk network TN of a network operator OP2 and an access network area AREA with a subscriber access network AN of a network operator OP1.

The access network area AREA represents a given geographical division, such as a local telephone service area, to which a numbering range is assigned. Each terminal in the access network area AREA is assigned a public number within this numbering range. Subscribers in the access network area AREA can address each other by dialling the public number of the respective called subscriber. To reach a subscriber not assigned to the access network area AREA, the public number of the called subscriber must be preceded by a trunk code or by a country code and a trunk code.

In the access network area AREA there are several access network operators with several subscriber access networks, of which only the subscriber access network AN of the network operator OP1 is shown in FIG. 1. All these subscriber access networks share the numbering range of the access network area AREA. Therefore, when dialling the number of a subscriber in the access network area AREA, it is irrelevant which of the subscriber access networks this subscriber is assigned to.

Each of the subscriber access networks is connected to the trunk network TN and advantageously also to the other subscriber access networks by No. 7 links.

The access network area AREA may also contain only one subscriber access network, the subscriber access network AN.

The trunk network TN contains several intermeshed transit exchanges. It serves to establish connections between subscriber access networks of different access network areas and is thus used for toll calls.

It is also possible to switch connections between terminals of different subscriber access networks of the access network area AREA via an exchange of the trunk network TN. Furthermore, different trunk networks of different trunk network operators may be provided in parallel, so that the trunk network to be used can be freely selected by the calling subscriber.

The subscriber access network AN contains a service exchange or service switching point SSP, a service control point SCP, and three private branch exchanges PABX1, PABX2, and PABX3. The private branch exchanges PABX1, PABX2, and PABX3 are connected to terminals TE1 to TE3, TE4 to TE6, and TE7, TE8, respectively.

The private branch exchanges PABX1 and PABX2 are interconnected by a tie trunk (not shown) to form a PABX cluster with a common number scheme and a common private numbering range. A system-specific, proprietary interface is provided between the private branch exchanges PABX1 and PABX2. Such a PABX cluster has the advantage that all PABX-specific service features are available in the entire PABX cluster.

The private branch exchanges in such a PABX cluster may also have separate private numbering ranges.

The terminals TE1 to TE8 are conventional terminals for a telecommunications network, such as telephones, fax units, but also computers with suitable interface cards which permit data communication. The terminals TE1 to TE8 are connected to the private branch exchanges PABX1 to PABX3 via an ISDN interface (ISDN=Integrated Services Digital Network). It is also possible to provide an analog subscriber line for connecting terminals to the private branch exchanges PABX1 to PABX3.

The private branch exchanges PABX1 to PABX3 are conventional PABX equipments, such as A4400 private branch exchanges of Alcatel SEL AG. Each of the private branch exchanges is connected to the service switching point SSP via a DSS1 interface.

It is also possible to connect the private branch exchanges PABX1 through PABX3 to the service switching point SSP via an interface according to the QSIG standard or via a system-specific interface (such as the ABCF interface of Alcatel SEL AG).

In the routing tables of the private branch exchanges PABX1 to PABX3, the respective public numbers of the terminals connected to the respective private branch exchange are contained as the respective extension numbers of the terminals. The internal, private numbering space of each of the private branch exchanges PABX1 to PABX3 thus corresponds in size to the numbering range of the access network area AREA, so that in the internal numbering plan, a terminal of the private branch exchange PABX1, for example, can be assigned any public number of the access network area AREA.

One or each of the private branch exchanges PABX1 to PABX3 may also be a wireless private branch exchange, for example an exchange based on the DECT standard.

The service switching point SSP is an exchange using public network switching technology, which is connected via the No. 7 signaling system to a transit exchange of the trunk network TN and to exchanges of the other subscriber access networks of the access network area AREA. The private branch exchanges PABX1 to PABX3 are connected to the service switching point SSP, which handles all traffic between the private branch exchanges PABX1 to PABX3 as well as the external traffic of the private branch exchanges PABX1 to PABX3.

When a connection request containing a called public number CN arrives at the service switching point SSP, the latter will send a query with the call number CN to the service control point SCP. In response to this query, the service switching point SSP receives a virtual number CVN from the service control point SCP. It then enters the number CVN in the connection request in place of the number CN and routes the connection request onward in accordance with this new called number CVN.

Communication between the service switching point SSP and the service control point SCP is advantageously carried out according to the IN architecture (IN=Intelligent Network). The service control point SCP and the service switching point SSP incorporate, respectively, service control functionality and service switching functionality according to ITU-T Q.1214, for example.

Terminals can be connected not only to the private branch exchanges PABX1 to PABX3, but also to the service switching point SSP. Connection requests directed to such a terminal are detected by the service switching point SSP, which routes them onward without sending a query to the service control point SCP. Such connection requests may also initiate a query to the service control point SCP, which then sends back the number CN as the virtual number CVN.

The service control point SCP determines the virtual number CVN from the public number CN sent to it by the service switching point SSP. To do this, it determines that of the private branch exchanges PABX1 to PABX3 whose internal numbering plan contains the number CN as an extension number, and to which the called terminal is thus connected. It then forms the number CVN from the number CN and an identification of the private branch exchange determined, and sends it back to the service switching point SSP.

The structure of the service control point SCP will now be explained in more detail with reference to FIG. 2.

Figure 2:
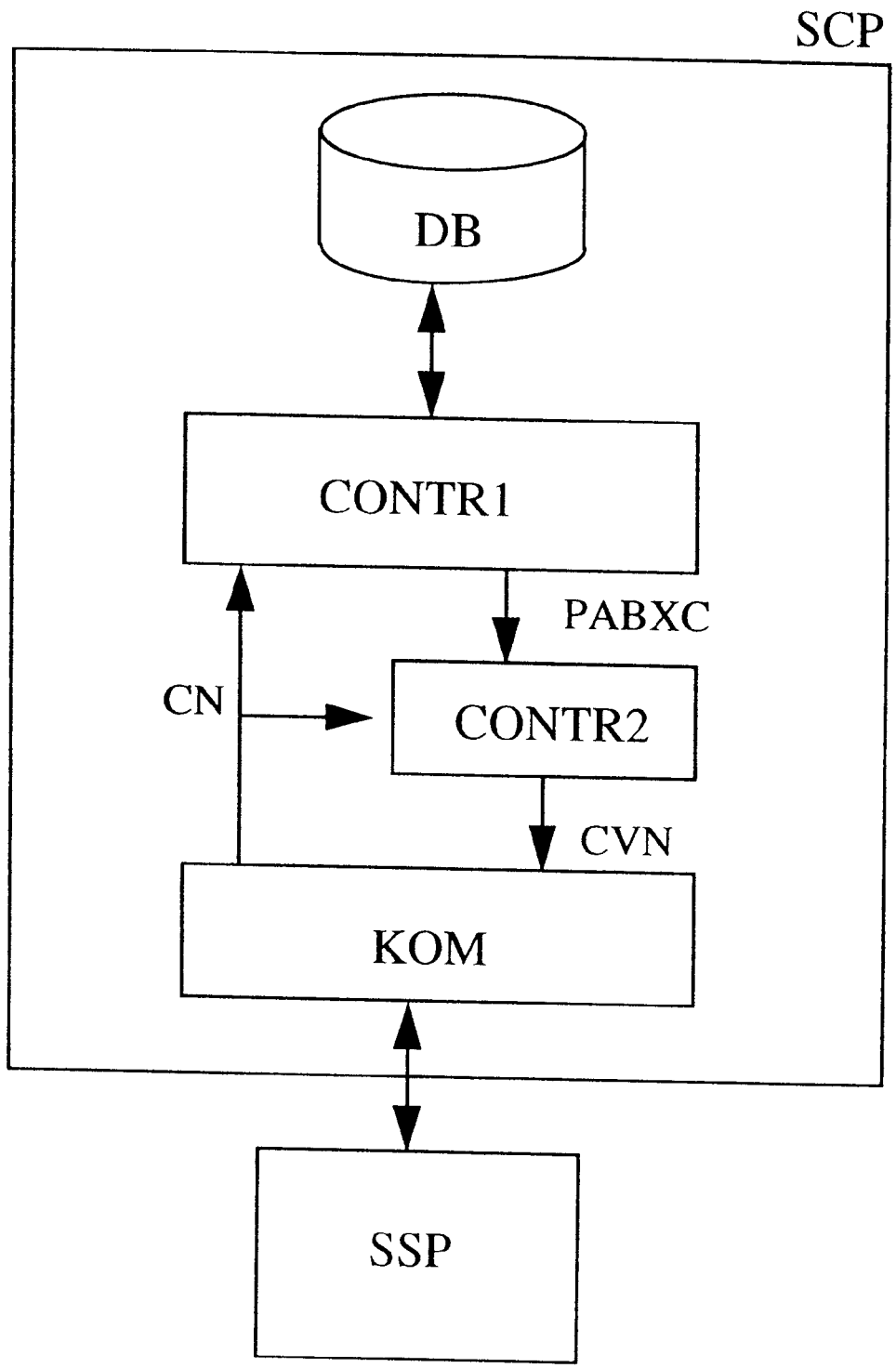
FIG. 2 is a block diagram of a service control point according to the invention and a service switching point for the subscriber access network of FIG. 1.

FIG. 2 shows the service control point SCP and the service switching point SSP.

The service control point SCP is constituted by a data processing platform with peripheral components which permit communication with the service switching point SSP via the No. 7 signaling system. It is also possible to use arbitrary other communication services for the communication between the service control point SCP and the service switching point SSP, such as an LAN (Local Area Network) or an ATM (Asynchronous Transfer Mode) link. On the data processing platform, control programs are executed which implement a database DB, two control functions CONTR1 and CONTR2, and a communications function KOM.

The communications function KOM implements the communications mechanisms necessary for data interchange and control instructions. It controls, among other things, the reception of the number CN, the insertion of the number CVN into the waiting connection request, and the onward routing of this connection request by the service switching point SSP. To implement these functions, it performs, for example, INAP operations (INAP=Intelligent Network Application Protocol) in the service switching point SSP.

In the database DB, information is stored in the form of a table showing which public number CN is assigned to which of the private branch exchanges PABX1 to PABX3.

It is possible to use for the database DB a database which serves to support number portability for the access network area AREA or for a higher-level network area. In such a database, information would be stored for all terminals of the access network area AREA or of further access network areas indicating to which of the exchanges they are connected and which of the subscriber access networks the terminal is assigned to. Such a global database could advantageously be accessed by several service control points so as to support number portability for the entire access network area AREA or for the higher-level network areas. In that case, the database DB advantageously would no longer be part of the service control point SCP.

The control function CONTR1 includes a search algorithm which, by accessing the database DB, determines for the number CN a private branch exchange PABXC whose numbering plan contains the number CN as the extension number of a terminal.

Each of the private branch exchanges PABX1 to PABX3 is assigned an internal private branch exchange identification, such as the identification 11, 12, or 13, respectively.

The control function CONTR2 determines this identification and forms the virtual number CVN by placing the identification ahead of the number CN. Tt then controls the entry of this virtual number as a calling number in the connection request. The number CN in the connection request is thus replaced with the number CVN.

It is also possible for the control function CONTR2 to transfer the private branch exchange identification to the service switching point SSP, which then enters this identification in the connection request ahead of the public number CN by itself, thus forming the virtual number CVN.

Advantageously, the service control point SCP also performs all other functions which support number portability within the access network area AREA or a higher-level network area. Thus, only a single access to a service control point is necessary to both support number portability and permit the use of private branch exchanges.

The subscriber access network AN may also comprise two or more service switching points of the same design as the service switching point SSP. Advantageously, all these switching points can access the central service control point SCP. Furthermore, the subscriber access network AN may contain further exchanges, so that a connection between the service switching point SSP and one of the private branch exchanges PABX1 to PABX3 can be established via these further exchanges.

It is also possible that the service control point SCP does not form part of the subscriber access network AN but represents a central service which is available to several subscriber access networks of the access network area AN.

In the following, different possibilities of establishing a connection to a subscriber A, who is assigned to the terminal TE5, will be explained with the aid of FIG. 1.

FIG. 1 shows subscribers A, D, and C, who are assigned to the terminals TE5, TE6, and TE7, respectively, as well an external subscriber B, whose terminal is connected to another subscriber access network.

A connection request from the external subscriber B is interpreted successively as usual, and finally routed to the service switching point SSP. The service switching point SSP takes the public called number CN, which represents the number within the numbering range of the subscriber access network AN, from the connection request and replaces it with the virtual number CVN. This number is then interpreted successively within the subscriber access network KN as usual. The service switching point SSP (and further exchanges, if present) interprets the private branch exchange identification at the beginning of the virtual number CVN, and routes the connection request to the private branch exchange PABX2 in accordance with the instructions contained in its routing table.

The private branch exchange PABX2 interprets the part of the number CVN behind the private branch exchange identification. This part corresponds to the number CN. The number CN is assigned to the terminal TE5 in the internal numbering range of the private branch exchange PABX2. The private branch exchange thus calls the terminal TE5 and, when subscriber A goes off-hook, initiates the establishment of the connection between subscribers B and A in the usual manner.

In the reverse case, i.e., when a connection is established from subscriber A to subscriber B, it is advantageous if the service switching point SSP replaces the virtual number of the calling terminal TE5 in the appropriate parameter field of the connection request by the public number of this terminal. To do this, the service switching point SSP only has to remove the private branch exchange identification from the calling virtual number. In this manner, the internal expansion of the number space becomes fully transparent.

The establishment of a connection from subscriber C, whose terminal TE7 is connected to the other private branch exchange PABX3, to subscriber A is analogous to the above-described connection setup between subscribers B and A.

A connection request from subscriber D, whose terminal TE6 is connected to the same private branch exchange PABX2, is switched completely by the private branch exchange PABX2. This is possible since the public number of the terminal TE5 is identical with the extension number of this terminal.

Exactly the same connection setup results for a connection between two subscribers of the same PABX cluster, such as a connection between subscribers of the private branch exchanges PABX1 and PABX2. In that case, the call is routed over the tie trunk between the two private branch exchanges PABX1 and PABX2.

In the second embodiment, the construction of a subscriber access network according to the invention using an exchange according to the invention will be described.

In that case, the subscriber access network is constructed like the subscriber access network AN of FIGS. 1 and 2 except that the switching unit formed by the service control point SCP and the service switching point SSP is implemented with a single exchange. To do this, the components DB, CONTR1, and CONTR2 of the service control point SCP and the service switching point SSP are integrated into a conventional exchange and incorporated into the procedure for handling a connection request. This exchange takes the number CN from a connection request, determines the virtual number CVN from it by means of the control functions CONTR1, CONTR2 and he database DB, and then routes the connection request with the number CVN onward.

What is claimed is:

1. A subscriber access network (AN) for the connection of terminals (TE1 to TE8) which can be reached through the subscriber access network (AN) by means of respective public numbers assigned to them in a public numbering range, the subscriber access network (AN) comprising a plurality of exchanges (SSP, PABX1 to PABX3) for connecting the terminals (TE1 to TE8) to the subscriber access network (AN), characterized in that two or more of the exchanges (PABX1 to PABX3) are private branch exchanges with respective private numbering ranges and each comprise first means adapted to assign to the terminals connected to the respective private branch exchange their respective public numbers as extension numbers in the respective private numbering range, that the subscriber access network (AN) comprises second means (CONTR1) for determining that of the two or more private branch exchanges from a connection request with a called public number (CN) in whose private numbering range the called public number is assigned to a terminal as an extension number, and that the subscriber access network (AN) comprises third means (CONTR2, SSP) for entering a virtual number (CVN), consisting of a private branch exchange identification assigned to the private branch exchange determined and the called public number, in the connection request as the called number.

2. A subscriber access network as claimed in claim 1, characterized in that the subscriber access network comprises fourth means adapted to remove the private branch exchange identification from a connection request containing a virtual number formed as a calling number from a public number and a private branch exchange identification, and to route the connection request with the public number onward as the calling number.

3. A subscriber access network as claimed in claim 2, characterized in that the second to third means or the second to fourth means, respectively, are located at a specific one of the exchanges of the subscriber access network, and that the specific exchange is connected to the two or more private branch exchanges.

4. A subscriber access network (AN) as claimed in claim 2, characterized in that the second means (CONTR1) are located at a service control point (SCP) of the subscriber access network (AN), that the service control point (SCP) is connected to at least one specific service exchange (SSP) of the subscriber access network, and that said at least one specific service exchange (SSP) is connected to the two or more private branch exchanges (PABX1 to PABX3).

5. A subscriber access network as claimed in claim 4, characterized in that the service control point (SCP) and the at least one specific service exchange (SSP) are adapted to communicate with one another according to the IN architecture.

6. A subscriber access network (AN) as claimed in claim 5, characterized in that two or more of the private branch exchanges (PABX1, PABX2) are interconnected and adapted to form a cluster of private branch exchanges which shares the same private numbering range.

7. A subscriber access network (AN) as claimed in claim 6, characterized in that all connections between the subscriber access network (AN) and further networks (TN) are routed through the specific exchange or the at least one specific service exchange (SSP).

8. A subscriber access network (AN) as claimed in claim 7, characterized in that the specific exchange or the at least one specific service exchange (SSP) is connected to at least one further exchange of the subscriber access network or of further networks via a No. 7 signaling system, and that the two or more private branch exchanges (PABX1 to PABX3) are connected to the specific exchange or the at least one specific service exchange (SSP) via a DSS1 interface.

9. An exchange for a subscriber access network for the connection of terminals which can be reached through the subscriber access network by means of respective public numbers assigned to them in a public numbering range, characterized in that the exchange comprises second means for determining those of two or more private branch exchanges of the subscriber access network from a connection request with a called public number in whose private numbering range the called public number is assigned to a terminal as an extension number, and that the exchange comprises third means for entering a virtual number, consisting of a private branch exchange identification assigned to the private branch exchange determined and the called public number, in the connection request as a called number.

10. A service control point (SCP) for a subscriber access network (AN) for the connection of terminals (TE1 to TE8) which can be reached through the subscriber access network (AN) by means of respective public numbers (CN) assigned to them in a public numbering range, the service control point (SCP) comprising first means (KOM) for communicating with a service exchange (SSP) of the subscriber access network (AN), characterized in that the service control point comprises second means (CONTR1) for determining that (PABXC) of two or more private branch exchanges (PABX1 to PABX3) of the subscriber access network from a connection request with a called public number (CN) in whose private numbering range the called public number (CN) is assigned to a terminal as an extension number, and that the service control point comprises third means (CONTR2) adapted to initiate the entry of a virtual number (CVN), consisting of a private branch exchange identification assigned to the private branch exchange determined and the called public number, in the connection request as a called number.

11. A method of establishing a connection to a terminal (TE5) of a subscriber access network (AN), the method comprising the step of routing a connection request directed to the terminal and containing a called public number (CN) corresponding to the number of the terminal according to a public numbering range to a switching unit (SSP, SCP) of the subscriber access network (AN), characterized in that by means of the called public number (CN), the switching unit (SSP, SCP) determines that of two or more private branch exchanges (PABX1 to PABX3) of the subscriber access network (AN) in whose private numbering range the called public number (CN) is assigned to the terminal (TE5) as an extension number, that the switching unit (SSP, SCP) forms a called virtual number (CVN) from the called public number (CN) and a private branch exchange identification assigned to the private branch exchange (PABX2) determined, and enters said called virtual number (CVN) in the connection request, and that the connection request with the called virtual number (CVN) is routed to the private branch exchange (PABX2) determined, thereby initiating the establishment of the connection.

12. A subscriber access network as claimed in claim 1, characterized in that the second to third means or the second to fourth means, respectively, are located at a specific one of the exchanges of the subscriber access network, and that the specific exchange is connected to the two or more private branch exchanges.

13. A subscriber access network (AN) as claimed in claim 1, characterized in that the second means (CONTR1) are located at a service control point (SCP) of the subscriber access network (AN), that the service control point (SCP) is connected to at least one specific service exchange (SSP) of the subscriber access network, and that said at least one specific service exchange (SSP) is connected to the two or more private branch exchanges (PABX1 to PABX3).

14. A subscriber access network as claimed in claim 13, characterized in that the service control point (SCP) and the at least one specific service exchange (SSP) are adapted to communicate with one another according to the IN architecture.

15. A subscriber access network (AN) as claimed in claim 1, characterized in that two or more of the private branch exchanges (PABX1, PABX2) are interconnected and adapted to form a cluster of private branch exchanges which shares the same private numbering range.

16. A subscriber access network (AN) as claimed in claim 3, characterized in that all connections between the subscriber access network (AN) and further networks (TN) are routed through the specific exchange or the at least one specific service exchange (SSP).

17. A subscriber access network (AN) as claimed in claim 3, characterized in that the specific exchange or the at least one specific service exchange (SSP) is connected to at least one further exchange of the subscriber access network or of further networks via a No. 7 signaling system, and that the two or more private branch exchanges (PABX1 to PABX3) are connected to the specific exchange or the at least one specific service exchange (SSP) via a DSS1 interface.

* * * * *